US008662897B2

(12) United States Patent
Sims, Jr.

(10) Patent No.: US 8,662,897 B2
(45) Date of Patent: Mar. 4, 2014

(54) TRAINEE INCENTIVE AND REWARD METHOD (75) Inventor: William Sims, Jr., Chapin, SC (US)

(73) Assignee: The Bill Sims Company, Irmo, SC (US)

(*) Notice: Subject to any disclaimer, the term of this patent is extended or adjusted under 35 U.S.C. 154(b) by 1417 days.

(21) Appl. No.: 12/372,236

(22) Filed: Feb. 17, 2009

(65) Prior Publication Data

US 2009/0157492 A1 Jun. 18, 2009

Related U.S. Application Data (63) Continuation-in-part of application No. PCT/US2008/068912, filed on Jul. 1, 2008, and a continuation-in-part of application No. 11/340,205, filed on Jan. 26, 2006, now abandoned.

(60) Provisional application No. 60/947,499, filed on Jul. 2, 2007, provisional application No. 60/660,300, filed on Mar. 10, 2005.

(51) Int. Cl.
G09B 19/00 (2006.01)

(52) U.S. Cl.
USPC ........... 434/219; 434/350; 434/336; 434/322; 705/11

(58) Field of Classification Search
USPC .............................. 434/219, 350, 336; 705/11
See application file for complete search history.

(56) References Cited

U.S. PATENT DOCUMENTS

| 5,743,746 | A | * | 4/1998 | Ho et al. ................. 434/332 |
| 6,061,660 | A | * | 5/2000 | Eggleston et al. ......... 705/14.12 |
| 6,325,631 | B1 | * | 12/2001 | Kouba et al. ............... 434/219 |
| 6,789,047 | B1 | * | 9/2004 | Woodson .................... 702/182 |
| 7,953,219 | B2 | * | 5/2011 | Freedman et al. ........ 379/265.06 |
| 8,468,047 | B2 | * | 6/2013 | Koller et al. ............... 705/7.42 |
| 2002/0127528 | A1 | * | 9/2002 | Potter ......................... 434/322 |
| 2003/0204440 | A1 | * | 10/2003 | Koller et al. ................ 705/11 |
| 2006/0204948 | A1 | * | 9/2006 | Sims, Jr. .................... 434/323 |

* cited by examiner

Primary Examiner — Nikolai A Gishnock
Assistant Examiner — Banafsheh Hadizonooz
(74) Attorney, Agent, or Firm — Shumaker, Loop & Kendrick, LLP (57) ABSTRACT The invention is a method and system that provides for efficiently incentivising and rewarding employees for their successful use of a training system or other employer defined metrics by utilizing Smartcard® cards and You Did It Right® cards. Successful demonstration of training and performance metrics is rewarded through such rewards as gift cards or discount coupons redeemable for goods and/or services at retail/service centers.

7 Claims, 13 Drawing Sheets

You-Did-It-Right    Code # 123-456-78

[X]    Lift with your legs not with your back

[ ]    Wearing proper safety equipment

| Employee ID #   | 5846265 |
|-----------------|---------|
| Supervisor ID#  | 6598542 |

Fig. 3

Smart Card    Code # 987-654-32

1. Carelessness on your part negatively affects the safety of others

2. Lift with your legs not with your back

3. Maintain a clean and orderly work area

Smart Card Login

| Smart Card Code # | |
| --- | --- |
| Employee ID # | |

Click To Take a Test!

Fig. 7

Smart Card Test (#987-654-32)

T F

☐ ☐ Carelessness on your part does not affect the safety of others.

☐ ☐ It is better to lift with your legs than with your back.

☐ ☐ It is important to maintain a clean and orderly work area.

Click to Submit!

TRAINEE INCENTIVE AND REWARD METHOD

RELATED APPLICATIONS

This application is a Continuation-In-Part Application that claims the benefit of pending PCT Application number PCT/US08/68912 filed on Jul. 1, 2008 which claims the benefit of U.S. Provisional Application having Ser. No. 60/947,499 filed on Jul. 2, 2007. This Continuation-In-Part application also claims the benefit of pending U.S. Application having Ser. No. 11/340,205 filed on Jan. 26, 2006 which claims the benefit of U.S. Provisional Application having Ser. No. 60/660,300 on Mar. 10, 2005.

REFERENCED OR INCORPORATED MATERIAL

PCT Application PCT/US08/68912 and U.S. application Ser. No. 11/340,205 and their parent U.S. Provisional Applications, respectively 60/947,499 and 60/660,300, are herein incorporated by reference in their entireties.

FEDERALLY SPONSORED RESEARCH OR DEVELOPMENT

Not applicable.

FIELD OF THE INVENTION

The present invention relates to the field of employee incentives and in particular to a method of incentivising and rewarding employees whereby incentive rewards are presented to employees after they satisfactorily complete a training module, meet health/fitness goals, or otherwise satisfactorily perform actions that the employer wants to incentivise.

SUMMARY OF THE INVENTION

It is an object of the present invention to provide a novel method for efficiently incentivising and rewarding employees for their successful use of the training system, health regime, sales goals, injury prevention, or other employer defined performance metrics by utilizing rewards in the form of gifts or discount coupons redeemable for goods and/or services at retail/service centers. In alternate embodiments, these discount coupons are only redeemed when further combined with employees' own money. This system provides employers with a way of infusing incentive and training goals into an employment setting with a balanced cost. The boundaries of the present invention are not limited by the brick and mortar, pen and paper world as the invention may be utilized via the internet or other virtual settings.

In this novel way, the present invention includes discrete steps applied to train or otherwise measure progress of employees, reward employees, and capture the essence of the applied reward as it relates to the completed training module or satisfied performance metric. Thus, the system is designed to concentrate the reward so as to parallel the benefit gained by the employer via the training or performance metric.

DETAILED DESCRIPTION

Figure 1:
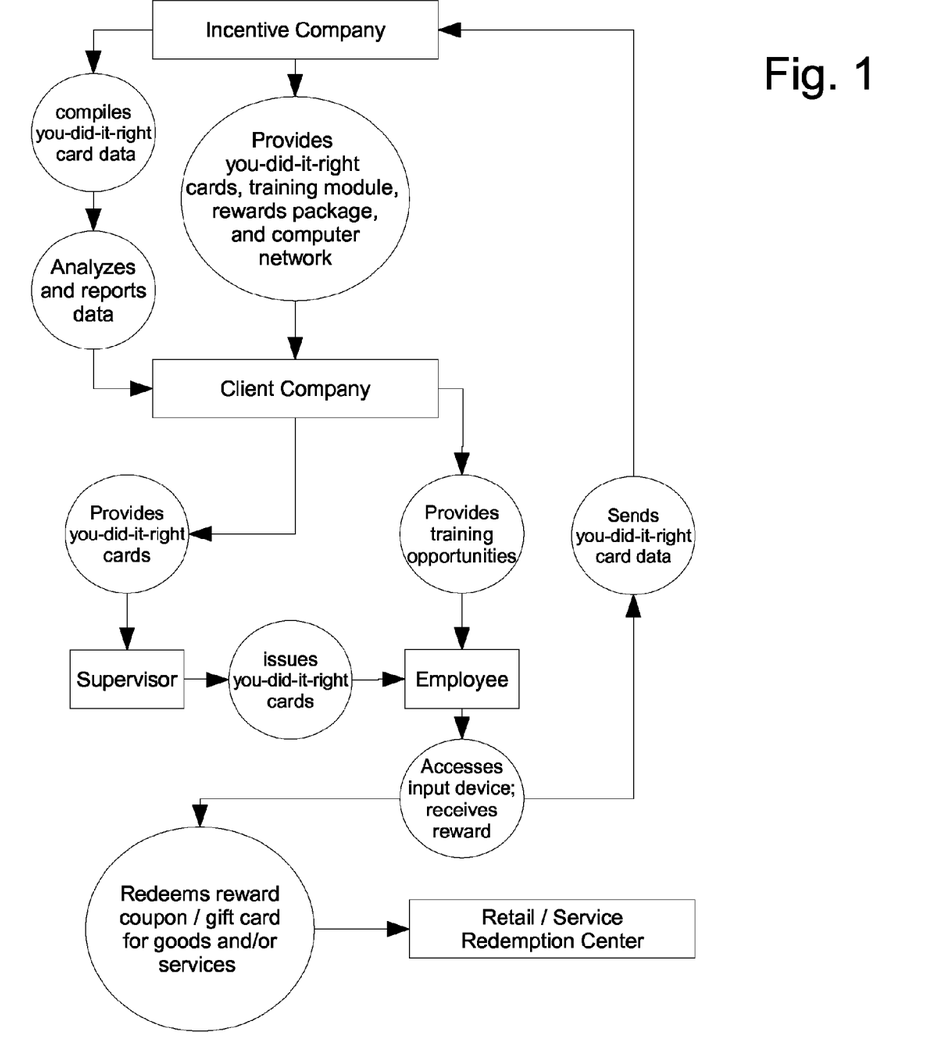
FIG. 1 is a flow diagram showing the method of rewarding trainees that utilizes a You Did It Right!® card.
Figure 2:
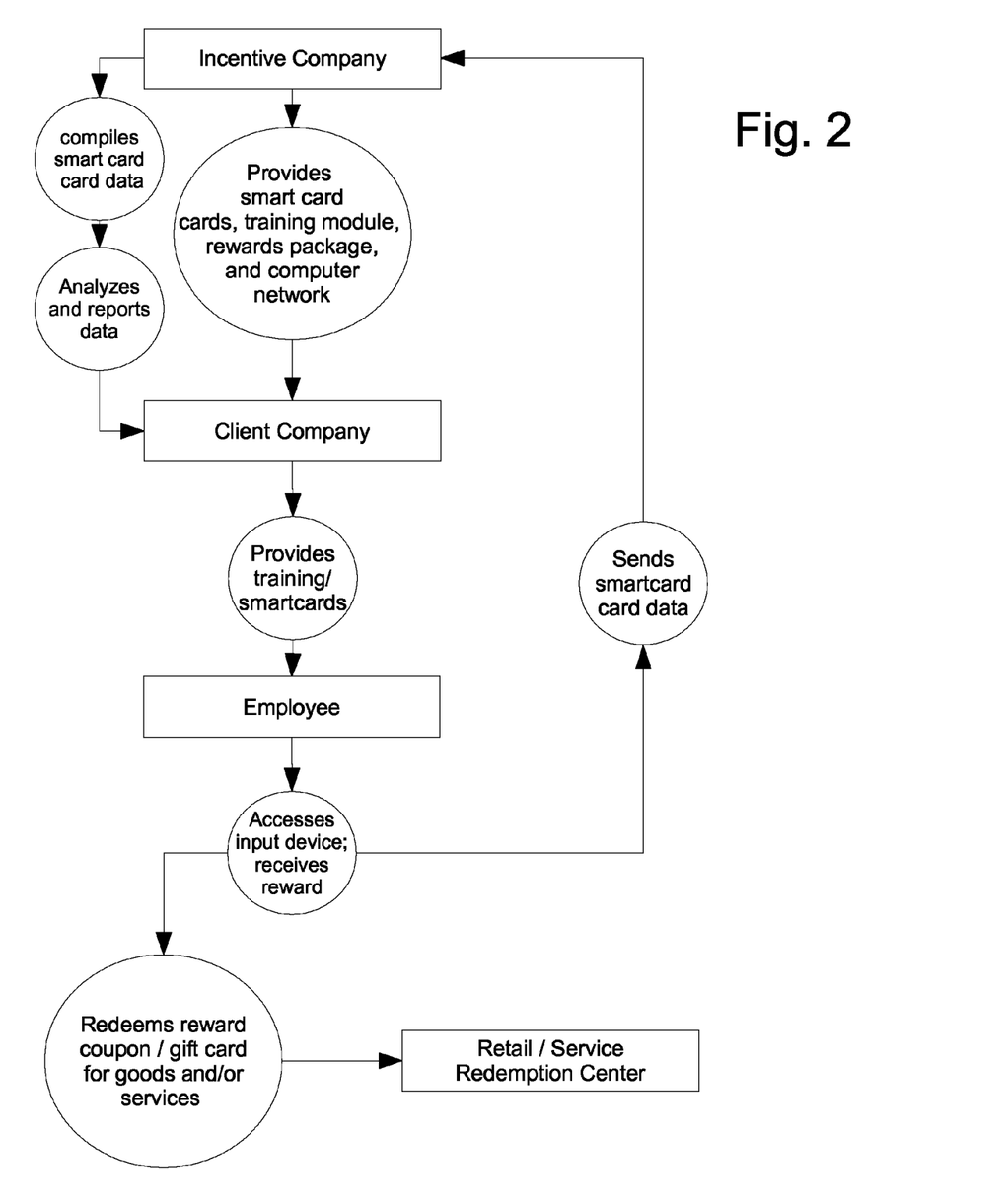
FIG. 2 is a flow diagram showing the method of rewarding trainees that utilizes a SmartCard® card.
Figure 3:
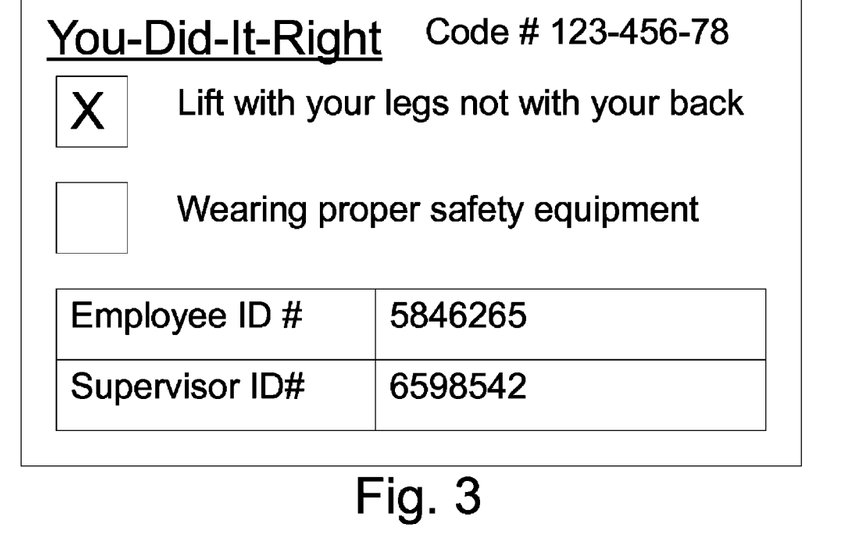
FIG. 3 is an example representation of a You Did It Right! card.
Figure 4:
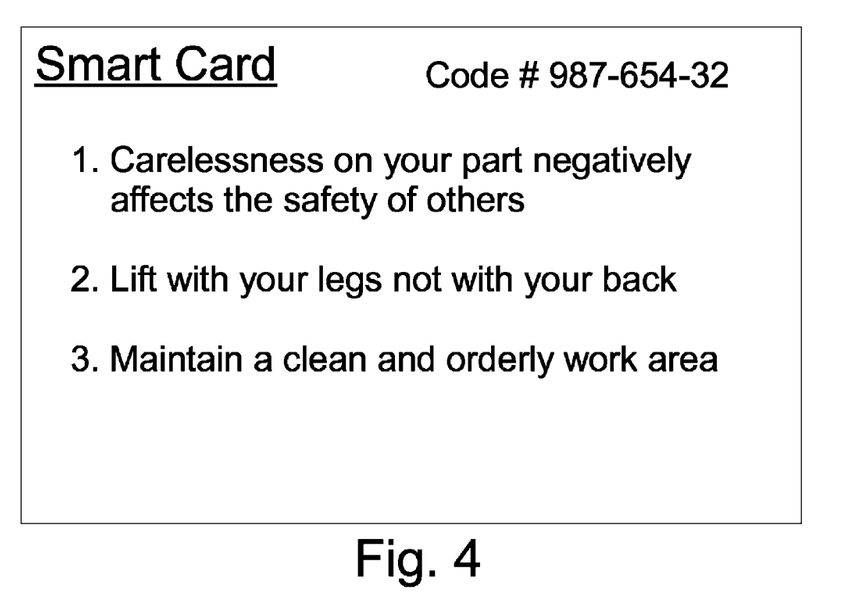
FIG. 4 is an example representation of a SmartCard card.
Figure 5:
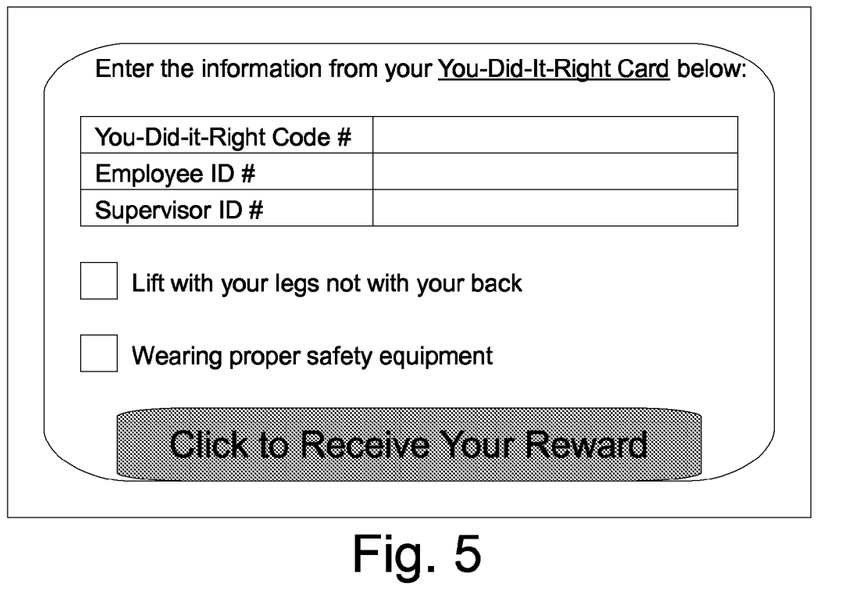
FIG. 5 is an example representation of an input screen of an interactive input response device where the device is a personal computer terminal and the method of rewarding trainees utilizes the You Did It Right! card embodiment.
Figure 6:
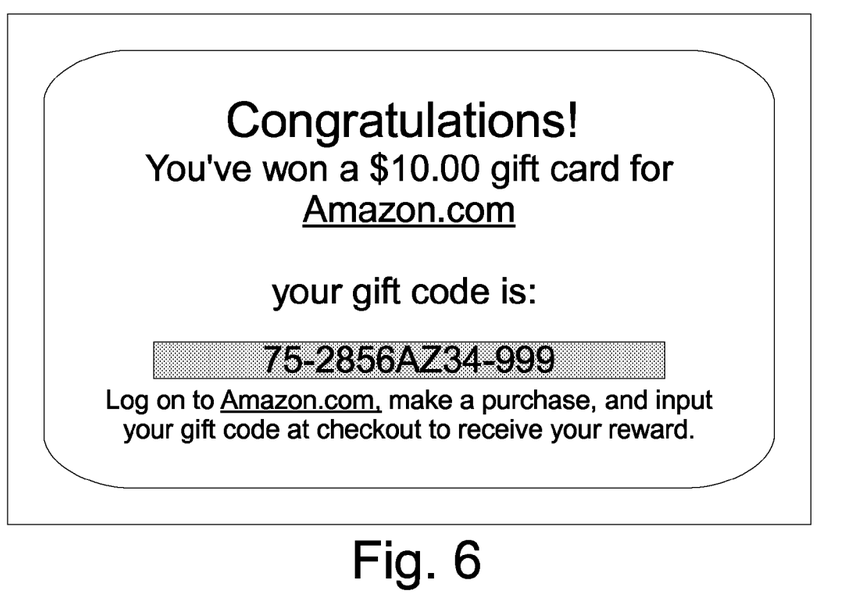
FIG. 6 is an example representation of a response screen of an interactive input response device where the device is a personal computer terminal and the reward is a gift code that may be used to acquire for goods/services.
Figure 7:
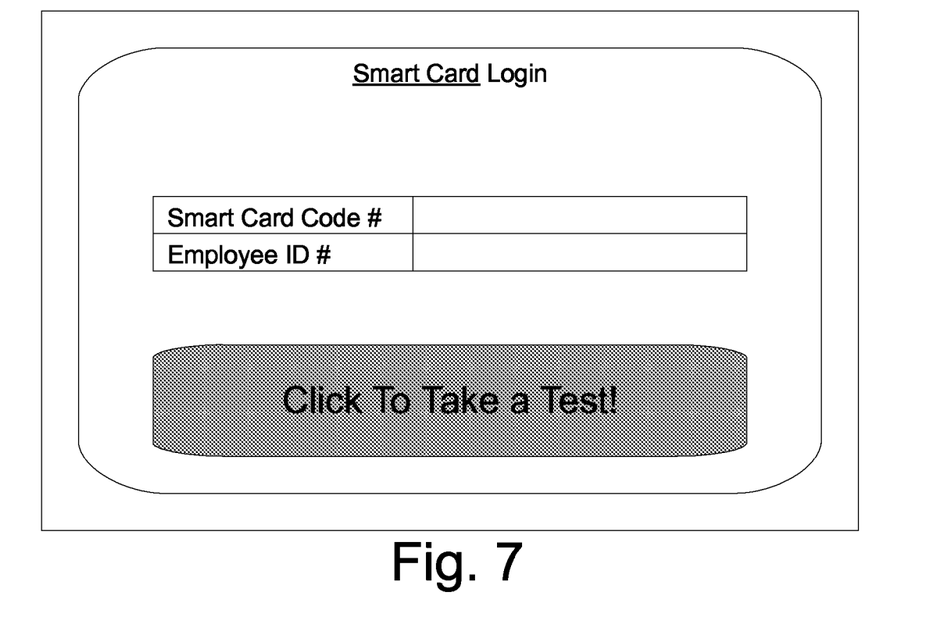
FIG. 7 is an example representation of an input screen of an interactive input response device where the device is a personal computer terminal and the method of rewarding trainees utilizes the SmartCard card embodiment.
Figure 8:
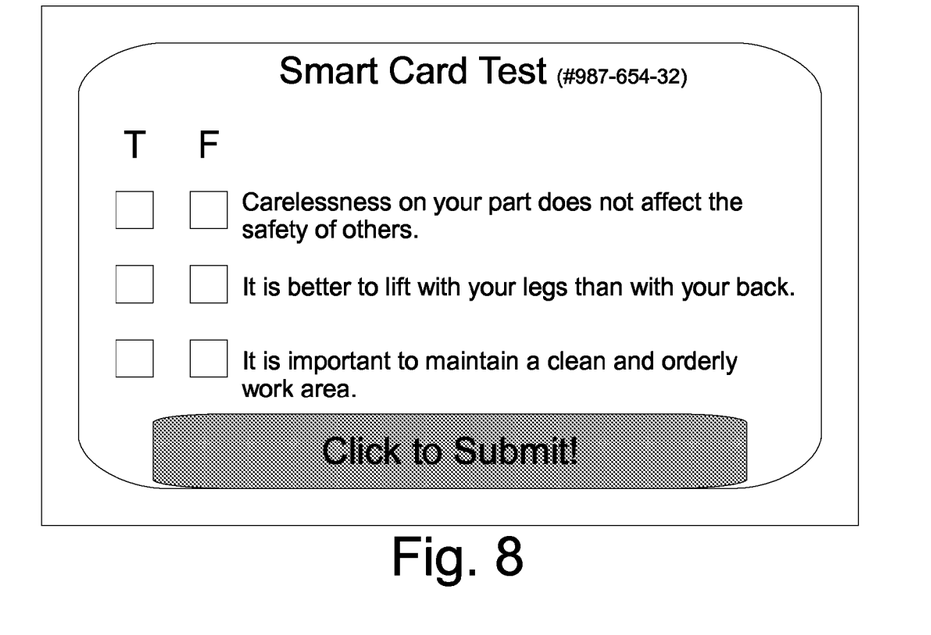
FIG. 8 is an example representation of an input testing screen of an interactive input response device where the device is a personal computer terminal and the method of rewarding trainees utilizes the SmartCard card embodiment.
Figure 9:
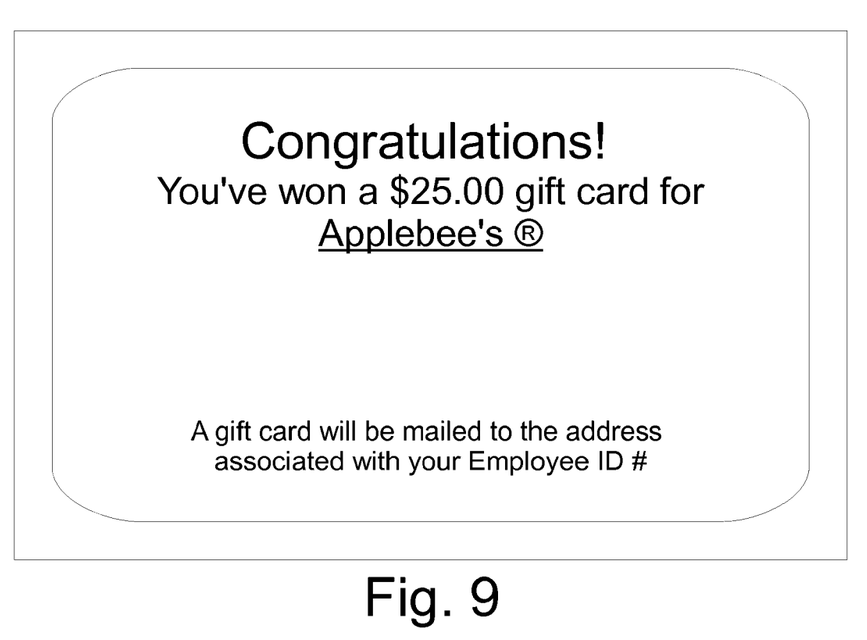
FIG. 9 is an example representation of a response screen of an interactive input response device where the device is a personal computer terminal and the reward is a gift card that will be mailed to the employee and may be redeemed for goods/services.
Figure 10:
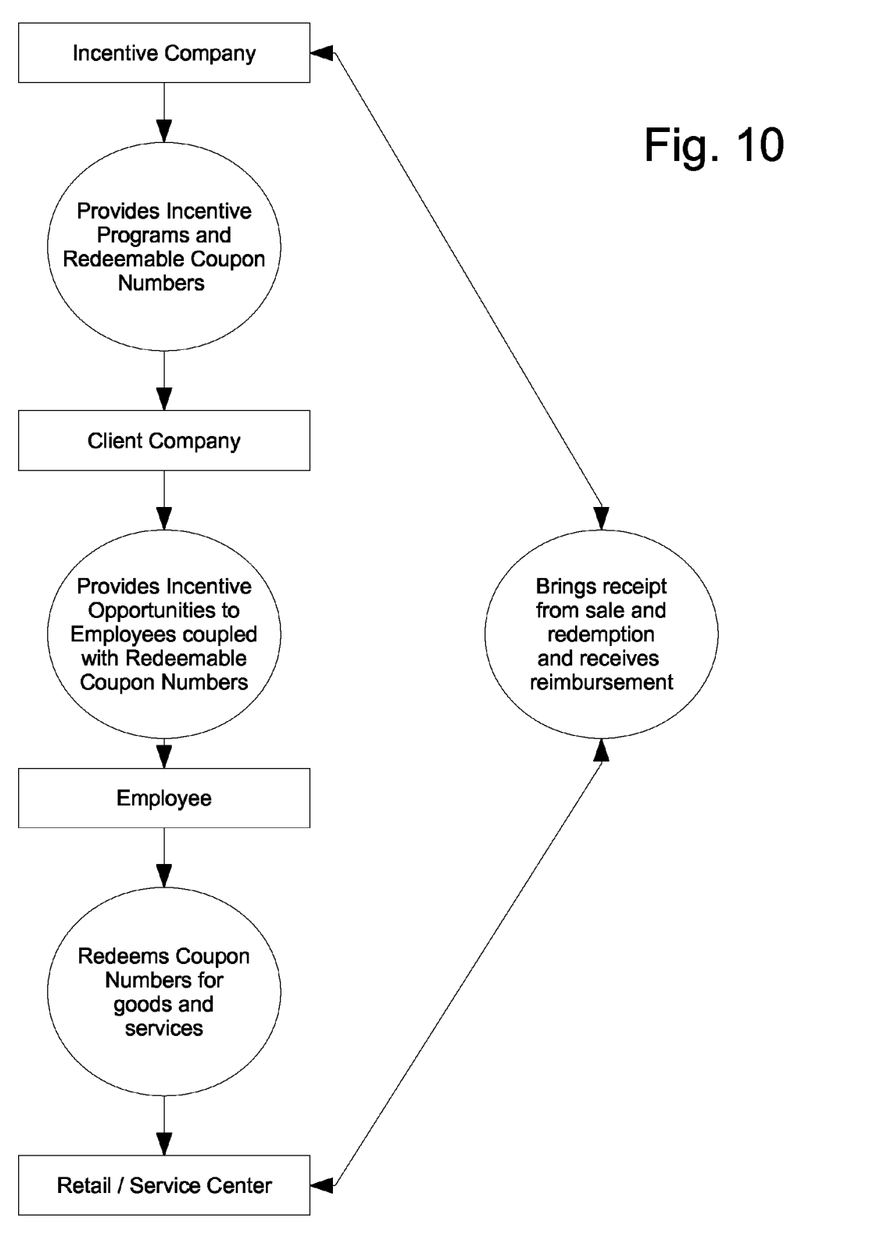
FIG. 10 is a flow diagram showing the basic method without a $3^{rd}$ party card provider.
Figure 11:
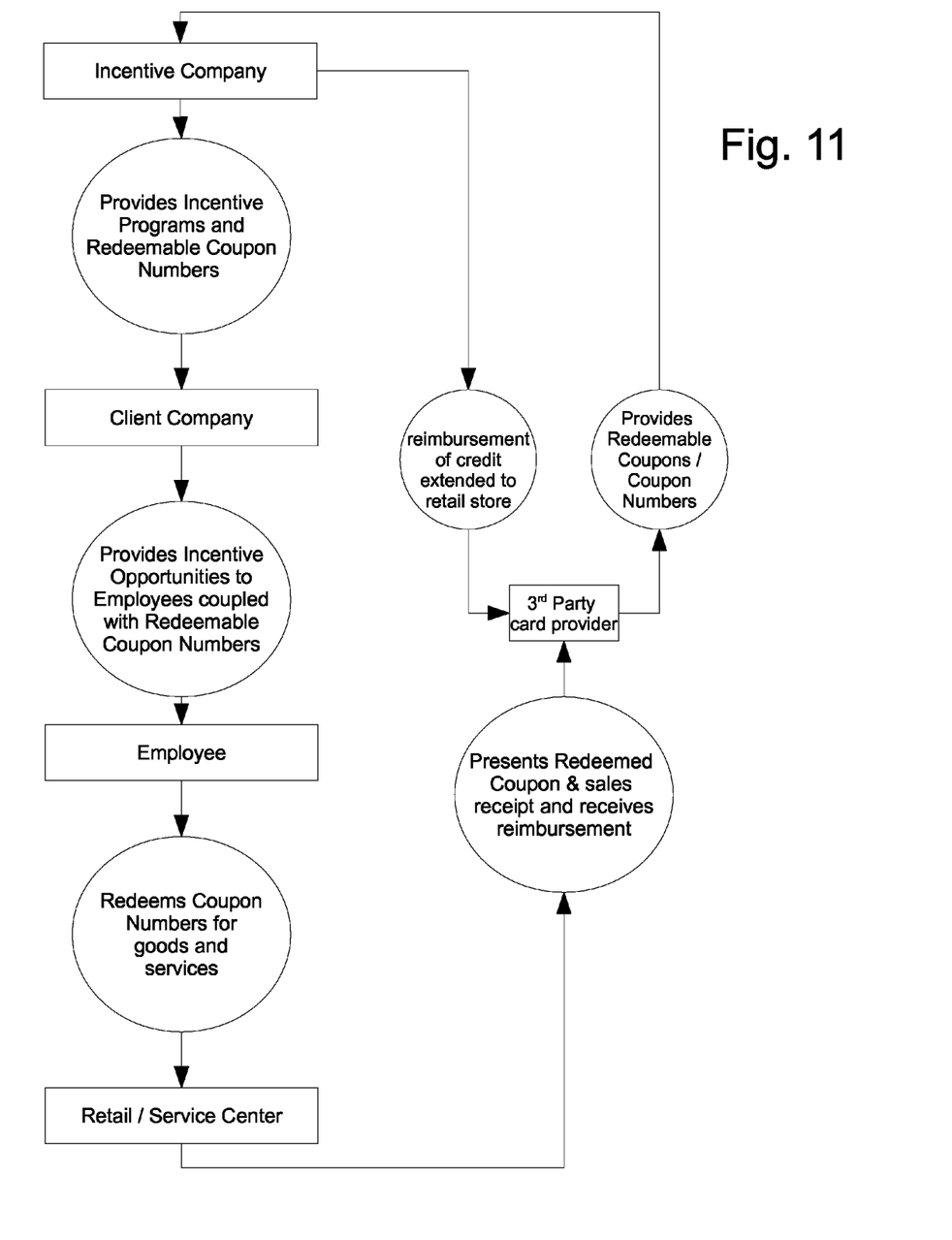
FIG. 11 is a flow diagram showing the basic method utilizing a $3^{rd}$ party card provider.
Figure 12:
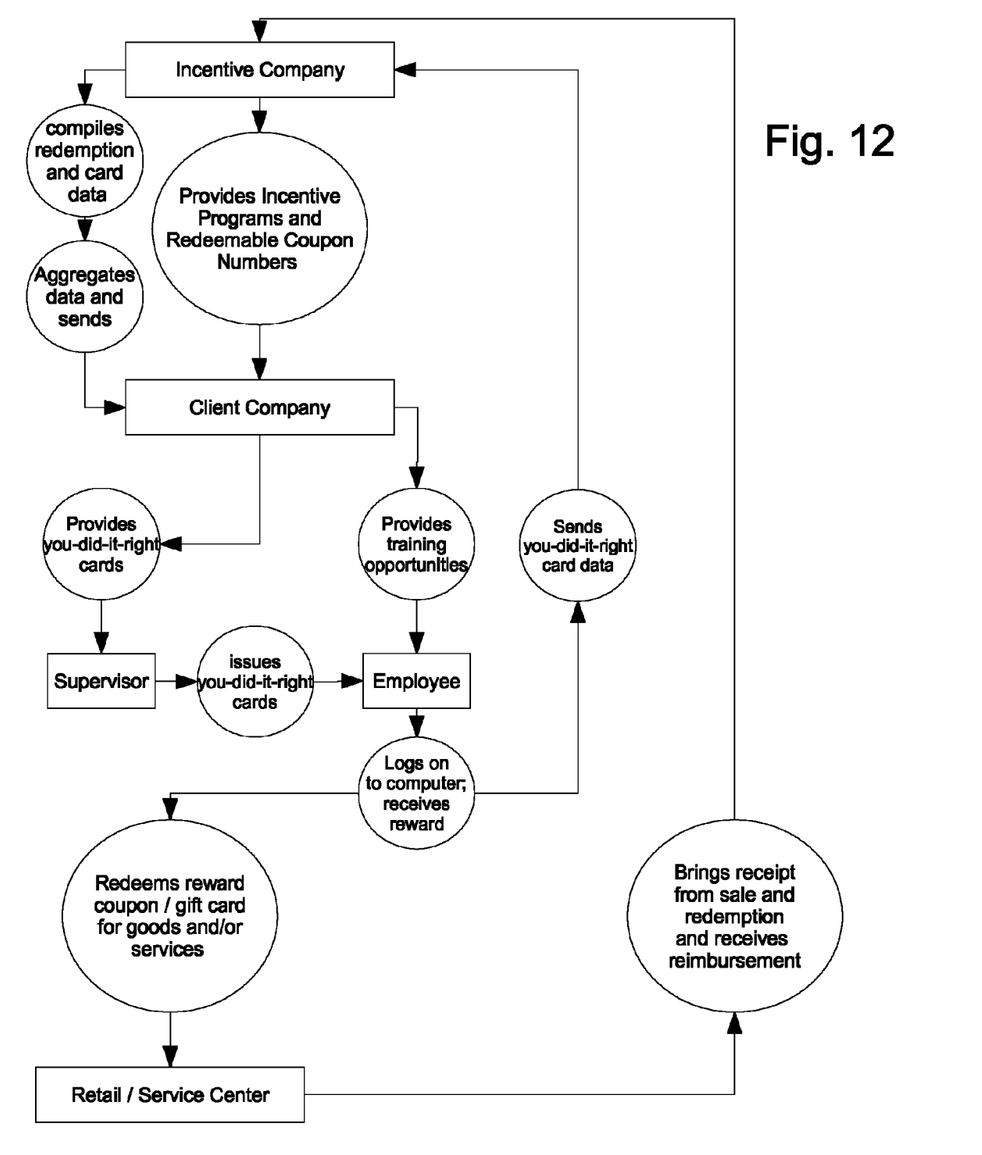
FIG. 12 is a flow diagram showing the utilization of a You Did It Right! card as part of the method where the incentive company contracts with the retail/service center.
Figure 13:
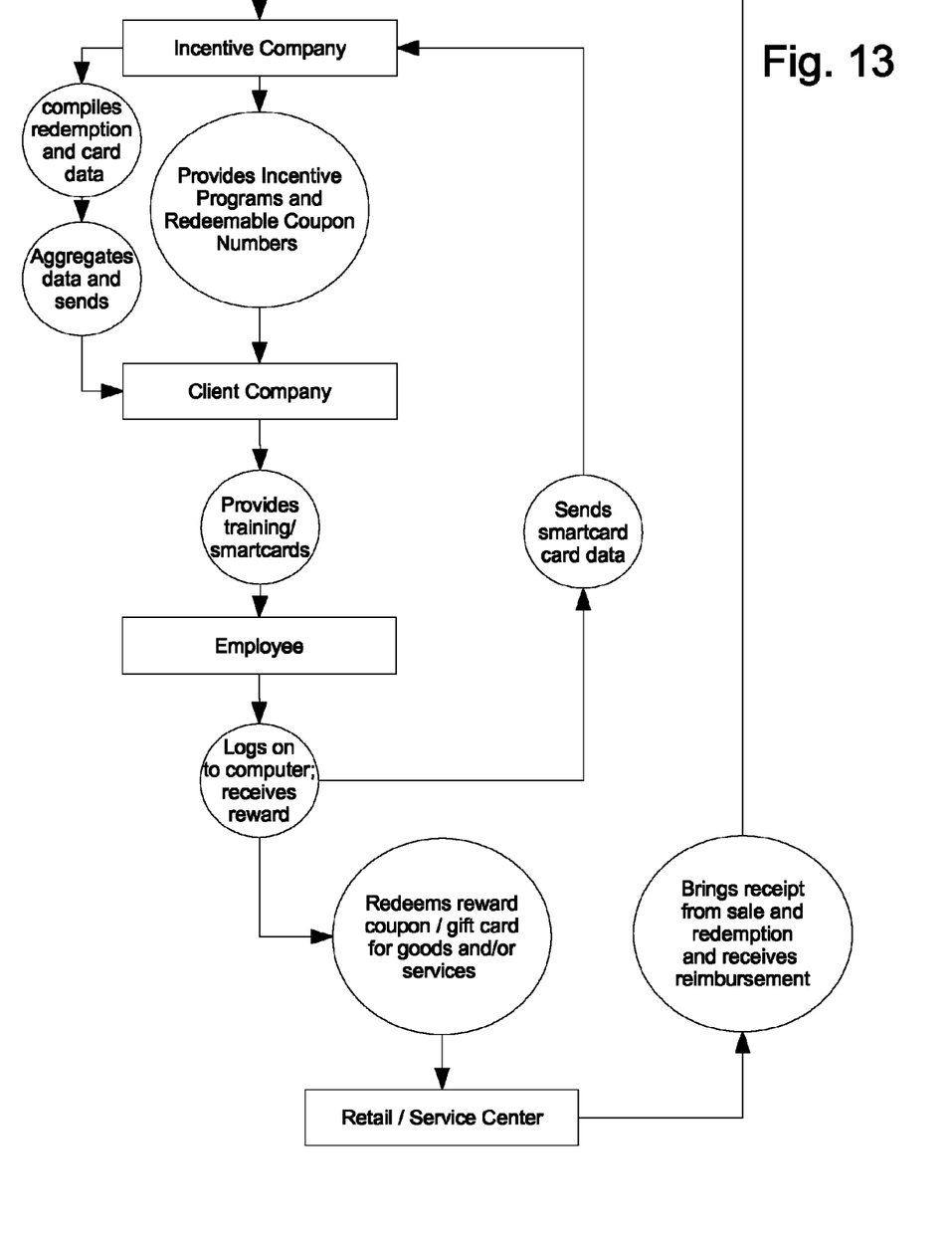
FIG. 13 is a flow diagram showing the utilization of a SmartCard as part of the method where the incentive company contracts with the retail/service center.
Figure 14:
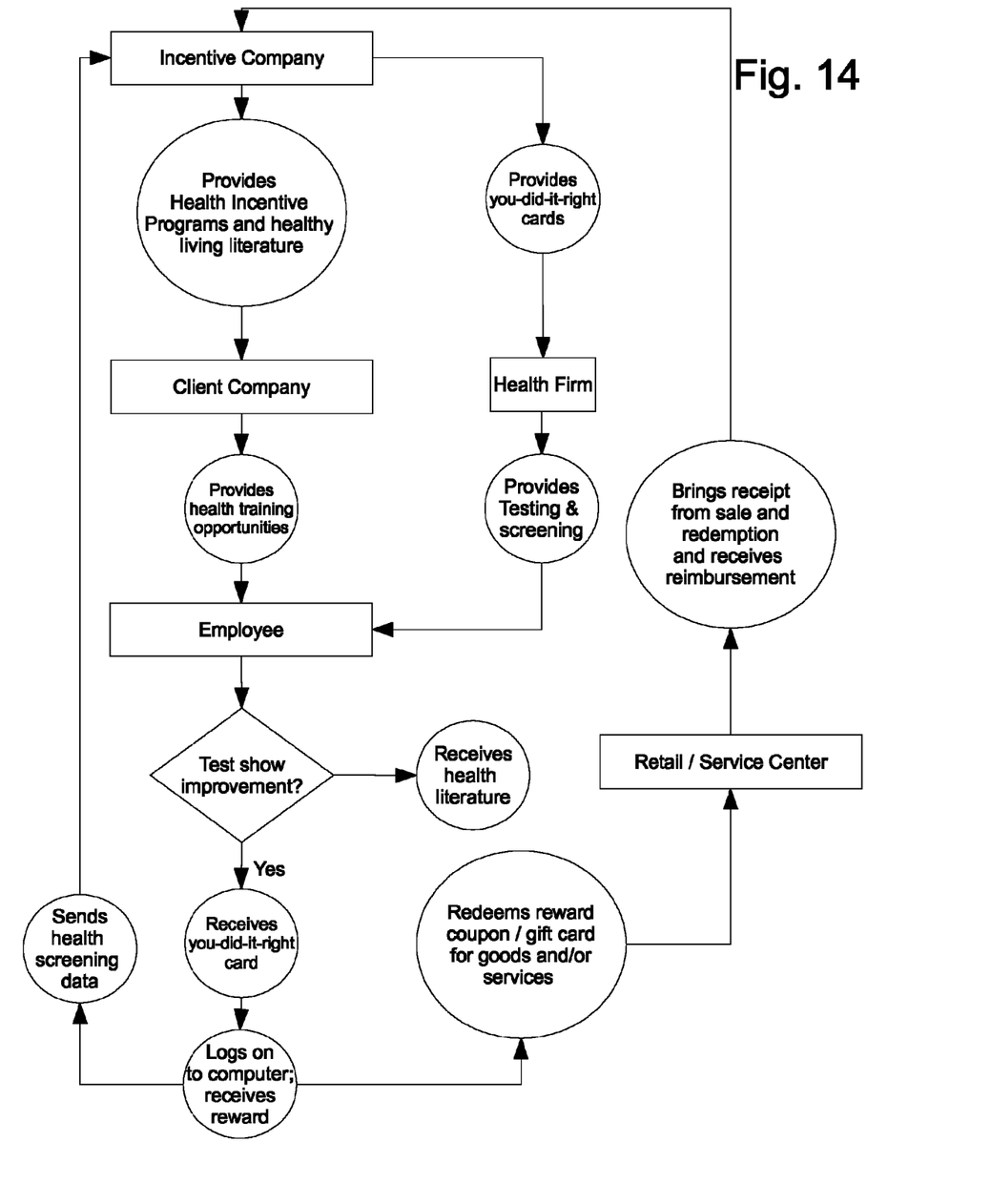
FIG. 14 is a flow diagram showing the health screening embodiment of the method.
Figure 15:
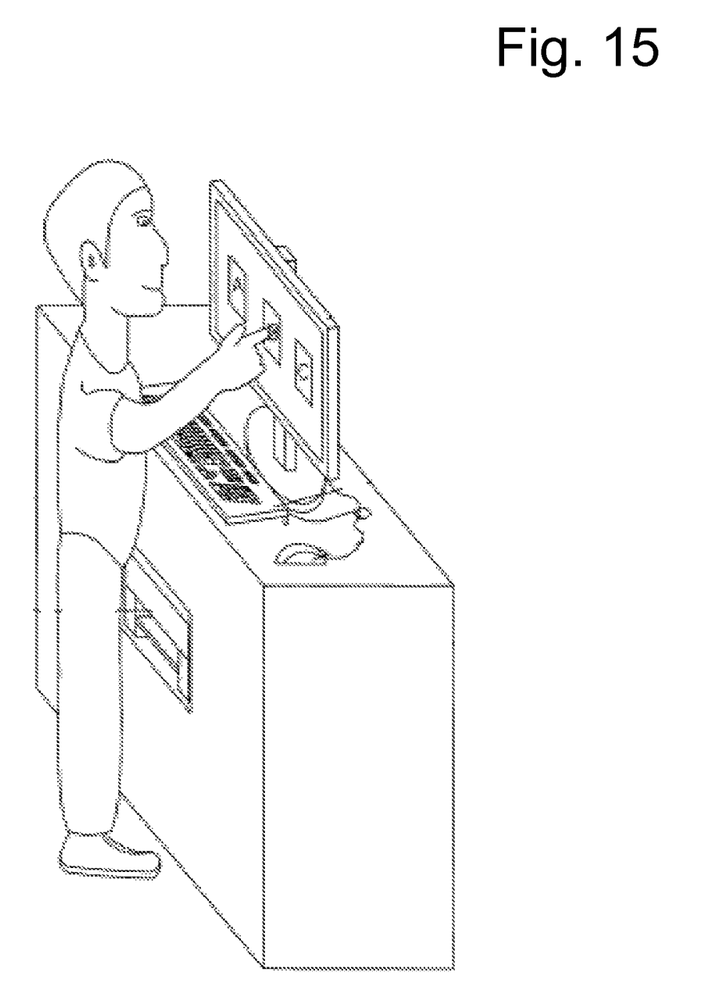
FIG. 15 is a perspective drawing showing an employee using the interactive input response device where the device is a personal computer terminal.
Figure 16:
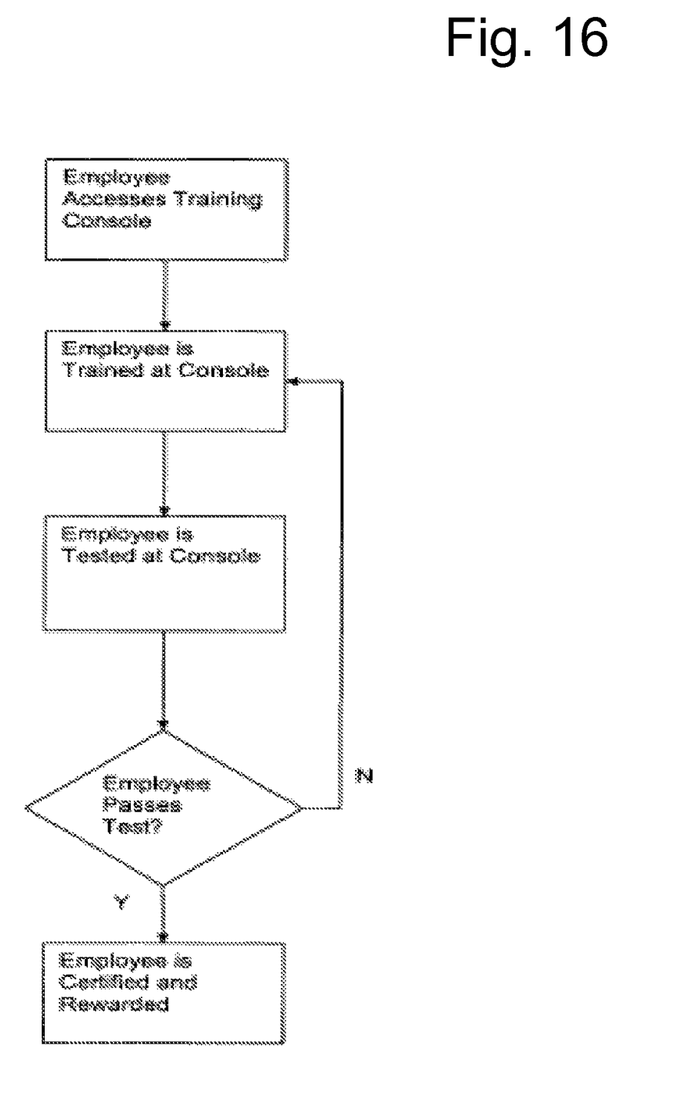
FIG. 16 is a flow diagram showing the testing subroutine that takes place during the testing step where the employee is tested.

It is to be understood by a person having ordinary skill in the art that the present discussion is a description of exemplary embodiments only, and is not intended as limiting the broader aspects of the present invention. The following examples are provided to further illustrate the invention and are not to be construed to unduly limit the scope of the invention.

The present invention is defined by a number of steps with different actors or entities carrying out those steps. Typically, there are 4 or 5 principal actors. Depending on the particular embodiment, these actors can be identified by a number of different labels some of which will be explained herein.

The first actor is the client company. The client company is any organization that has a need to train or otherwise monitor and improve the performance of its individual constituents. Typically, this is a company that needs to train or monitor its employees. For instance, the company might wish to train employees about a new procedure or sales technique, or monitor efficient use of a machine, or even monitor and train regarding safety and personal health procedures. However, the client company could also be a school, a sports team, a government agency, or other such organizations. A school might wish to monitor teachers or educate students. The sports team might need to teach a technique or monitor personal health practices. Likewise, a government agency might need to train its employees.

A second actor is the individual employee. The employee is any human constituent of an organization that needs to be trained, incentivized, or otherwise monitored. Typically the employee works for a company but the employee could be a student, team member, or even an independent contractor performing work for the client company.

A third actor is the retail store or other entity that accepts reward cards and coupons from the employee and grants discounts on purchases of goods or services. This retail store offers goods or services to the employee. It can operate from brick and mortar store fronts or it can be virtual in nature operating via the Internet. In the preferred embodiment, the retail store or service center's trade name will appear on the face of the coupon. In one embodiment, several different retail stores may have their trademarks appear in connection with a single reward and coupon such that a single coupon may be redeemable at one of multiple retail stores.

A fourth actor is the incentive company. This entity provides training modules, health assessments, or performance metrics to the client company, based on client company's goals, along with correlated rewards and coupons. The performance metrics can be supplied to the incentive company up front as part of the contract between the client company and the incentive company or they can be supplied as necessary by supervisors or managers. For instance, in one embodiment, the incentive company provides the managers with a website where they can upload a few key behaviors that they want to incentivize. The incentive company collects, correlates, and analyzes incentive/performance data and reports such analysis and aggregate data to the client company. In alternate embodiments, the incentive company either produces the rewards and coupons itself, receives the rewards and coupons from the retail store, or receives the rewards and coupons from a third party card provider.

A fifth actor is a third party card provider. The third party card provider exists in alternate embodiments in order to facilitate the reward and coupon transfers between the retail establishments and the incentive company. As such, the third party card provider issues gift card rewards and/or the coupon rewards. This company can also extend credit to the incentive company to cover the potential for coupon redemption.

In addition to the principal actors, there are important concepts to define with respect to the present invention. First, there is the training module. The training module is a training process designed by the incentive company to meet the training needs of the client company. This module includes many different approaches to train the employees. Typically the training module will include an instruction step and a testing step.

The instruction step is used to convey individual nuggets of information to the employee. This instruction step could include seminars, lectures, demonstrations, or wall posters among many others. In an embodiment that uses wall posters, the posters are customizable whereby employers and/or their managers can upload key behaviors they want to incentivize and can also upload pictures for the posters (such as photo of an employee performing a task the correct way). The instruction step subject matter can vary greatly. It might involve instructions on proper use of a piece of machinery or it might involve work place etiquette. Further, the instruction step subject might extend to personal health and fitness or problem solving skills.

One embodiment of the instruction step utilizes a concept called "SmartCards." In this embodiment, the important nuggets of information are displayed in the facility on a poster for the employees to observe on a daily basis. In the preferred embodiment, these same nuggets are reproduced in miniature form on a small card, called a SmartCard, which the employee can carry around for reference and review. This SmartCard could be a physical card made of paper or other three dimensional material or it could be an email or other electronic form. In any event, the SmartCard will have a series of desired learning points displayed thereon that the employee is advised to study.

Likewise, the testing step can take many forms. In the preferred embodiment, the employee is tested on the information contained on the SmartCard or other embodiments of the instruction step via an interactive input response device. This interactive input response device is typically a computer terminal located in a kiosk in the facility or it could be a personal or office computer. In some embodiments a computer program running on the terminal would present a series of questions to the employee related to the nuggets on the SmartCard. In the preferred embodiment, the interactive input response device is in the form of a terminal directly linked via the internet or some intranet to the incentive company servers and database where code is executed that presents a series of questions related to the nuggets of information on the SmartCard. The employee would input answers via the computer to satisfy the testing step. In alternate embodiments, in place of a computer terminal, the testing step is actuated via the interactive input response device that could utilize a telephone or other means such as paper mail forms. In the case of a telephone, rather than directly logging onto the terminal, the employee would call a telephone number found on the SmartCard and the phone number would link to the incentive company's server database where the questions would be asked and the employee would respond.

In the case of the SmartCard embodiment, the SmartCard itself would also include an alpha-numeric identifier that is entered by the employee into the interactive input response device so that the incentive company servers know which questions apply to the data contained on the SmartCard. Likewise, the alpha-numeric identifier could be entered via telephone or via other means such as paper mail forms.

The training module may also be a set of performance metrics used to monitor and judge the performance of employees for particular tasks and job requirements. For instance, employers would monitor employees to see if they are performing satisfactorily in compliance with these metrics. Observation of compliance with these metrics would parallel successful testing in the testing sub-step. Employees would, thus, be expected to demonstrate information gleaned in the instruction step by integrating that information into their job performance. When the supervisors, peer employees, or others depending on the particular embodiment, notice the advancement based on the nuggets, the employee would satisfy the testing step requirements. In one embodiment of this form of the training and testing module, the supervisor would be given a number of "You Did It Right!" cards, and, upon observing compliance with the performance metrics, would be entitled to distribute the You Did It Right! cards to the respective employees who satisfied the performance metric. The You Did It Right! card would have an alpha-numeric identifier and also have fields for the supervisor to fill in such information as the ID number of the employee observed, the ID number of the supervisor who observed the employee, the date observed, and check boxes for the behaviors observed in compliance with the training step. To complete the testing step, the employee would enter this information from the You Did It Right! card along with the alpha-numeric number into the interactive input response device such as a computer terminal or other means such as a telephone. This information is thereby related to and stored in the incentive company's database for analysis. In this way, the You Did It Right! card is thus a way to validate that feedback was given and to eliminate pencil whipping among other positive outcomes.

Parallel to the concept of issuing You Did It Right! cards for demonstration of performance metrics is issuing you-did-it-wrong cards for failure to demonstrate the performance metrics correctly. Here the supervisors are given a set of you-did-it wrong cards where they fill out the employee ID number of the employee and the employee ID number of the supervisor. The supervisor then checks off what the employee was observed doing incorrectly. The supervisor logs this information in through the interactive input response device and issues the card to the employee. This information is thereby related to and stored in the incentive company's database for analysis and later presentment to the client company.

According to an embodiment of the invention, a method for training a trainee and rewarding a supervisor of a trainee comprises the additional steps of calculating the value and type of reward to be given to the supervisor by the network system computer; and issuing the supervisor a reward.

Another concept that needs to be defined is the critical rewards concept. The reward is a valuable offering provided upon the satisfactory completion of the testing step of a training module. Typically the client company is seen as conferring the reward on the employee. The reward, however, may originate from a variety of sources, including the incentive company as in the preferred embodiment. The reward may be a physical good and it may also be a gift card that can be redeemed for goods, services, or other employee related perks such as additional vacation days. The reward may be in the form of redeemable token-tickets which may be collected and later redeemed for physical prizes from stores or catalogues. The reward might be a scratch off card where the employee scratches off one or more hidden areas to reveal prizes. This scratch off might be a physical card or it could be an online virtual scratch off. In such a virtual scratch off, the virtual scratch off comprises a web page comprising a scratch off area which reveals a prize when the user clicks inside the scratch off area. The prize could be a movie ticket, a trip/vacation, or meal. In one embodiment of the present invention, the reward is a discount coupon that can be redeemed at the retail store. This coupon can take on a variety of forms. It could literally be a piece of paper indicating a discount on a particular brand item, on a particular class of goods, from a particular store, or from a particular group of stores. For example, the coupon might apply to Nike® shoes from any store, or to any footwear from any store, or to any goods from a Foot Locker® store, or to any goods from a Foot Locker® or a Wal-Mart® store, or to an Olive Garden Italian Restaurant® eating establishment or to any combination thereof.

In each of these rewards scenarios described above, the reward is preferably issued from the incentive company. In the embodiments where the employee contacts the incentive company servers via the interactive input response device, the servers are programmed to issue the reward. The type of reward issued can vary depending on the particular embodiment. The reward could be directly tied to the particular nuggets gleaned and successfully tested in a test on the interactive input response device in the SmartCard embodiment or observed in the You Did It Right! card embodiment. The reward could also be given at random so that one satisfaction of the testing step results in, for instance, a $10 gift card, a $20 gift card, or a $100 gift card chosen at random. Additionally, in the preferred embodiment, the reward may alternatively be linked to a variable win algorithm that rewards first time employees more often and with higher value gifts than repeat employees. In all cases, the reward system screens out the employees from fraudulently claiming more cards than received and likewise monitors supervisors distribution of cards to prevent managers from unfairly rewarding the same employee too frequently.

Importantly, the coupon is not limited to the brick and mortar world, that is, it can be used in the virtual world of the Internet. Each coupon will have a unique identification number associated with it as well as other information about the value of the reward, the redemption locations to which it is tied, and any other applicable conditions. The identification number can be entered in the appropriate manner on a website of a retail store that honors the coupon. In this way, the holder of the coupon would be able to use the identification number to redeem the reward over the Internet. Additionally, this identification number may be displayed literally using Arabic numerals but it could be represented via scanner/computer readable bar code or otherwise with imbedded binary numbers readable by a computer.

As for the value of the reward, the amount could vary considerably. In the coupon embodiment however, the basic concept is that the employee would be offered a discount. In many cases the employee would still be required to convey some of his or her own money in order to complete the transaction. The coupon could, thus, be $5.00 off of a purchase of $10.00 or $50.00 off of a purchase of $100.00. Just the same, the coupon could be 25% off total purchase or 50% off of a single item purchase. Moreover, the coupon could also be for $20.00 off of a purchase of $20.00 or more in which case the employee would not have to use any of his or her own money if the purchase amounted to exactly $20.00.

Utilizing these entities and concepts, the present invention further contemplates a system whereby incentive companies contract either directly with retail stores or through third party card providers to obtain redeemable coupons. The incentive companies also contract with client companies to provide training modules and reward packages integrating the redeemable coupons. When the training modules are satisfactorily completed by the trainees or employees, reward coupons are distributed to the employees. The employees then take the coupons to the relevant retail store front, either the physical store or the online store, where the employees make purchases using their own money in combination with the discount coupon. The retailer (or service provider) then, having extended provisional credit to the coupon generator, applies to the respective coupon generator, that is either to the third party card provider or directly to the incentive company. In the case of the third party card provider, that entity will then, in turn, apply the redeemed coupon to the incentive company for reimbursement.

A final step in alternate embodiments occurs after the primary cycle has been completed, that is, after the instruction, the testing, the rewarding, and, alternatively in some embodiments, the redemption, the re-imbursement, etc. . . . This final step is the reporting step and involves the aggregation of data by the incentive company and then the reporting back to the client company this data. For instance, in a hypothetical manufacturing setting, the incentive company would provide the client company with SmartCards and associated potential rewards to teach ergonomic methods for lifting a box. The client company would offer instruction to the employees and distribute the SmartCards to the employees. The employees would then access an interactive input response device such as a computer terminal or telephone, enter the SmartCard alpha numeric number, take a test, receive a reward for passing the test, and redeem the reward at a retail location. The retail center then seeks reimbursement (as necessary such as for the coupon embodiment) from either the third party card provider or the incentive company as necessitated by the particular embodiment. The incentive company receives information on test passage rates regarding the various employees via the computer terminal and data regarding their respective redemptions of rewards via retail centers and/or the third party card providers. The incentive company then aggregates, analyzes, and reports the data to the client company. The data can be aggregated and sorted into unit areas, sub areas, particular supervisor areas, or other divisions from companywide level down to the individual level. For each level, the progress or lack thereof can be tracked and monitored. For instance, in a factory, second shift supervisors might observe 3 employees lifting with their legs and not their backs and accordingly hand out 3 You Did It Right! cards in month 1. If they then handed out 7 such You Did It Right! cards in month 2, the incentive company would track this data and report it back to the client company. This report would be in the form of updatable wall posters but also on a website portal or dashboard. For instance, the website view will represent all managers as color coded dots with red for noncompliant, yellow for marginal compliance, and green for full compliance with the improvement metrics. Additionally, clicking on the coded dots reveals the underlying raw data.

Likewise, in a hypothetical manufacturing setting where You Did It Right! cards are utilized, the incentive company would provide the client company with the You Did It Right! cards and associated potential rewards to reward successful utilization of ergonomic methods for lifting a box. The client company distributes the You Did It Right! cards to supervisors to use to reward employees. The employees, having received a You Did It Right! card would then access an interactive input response device such as a computer terminal, enter the You Did It Right! card data, receive a reward, and redeem the reward at a retail location. The retail center then seeks reimbursement (as necessary such as for the coupon embodiment) from either the third party card provider or the incentive company as necessitated by the particular embodiment. The incentive company receives information entered into the terminal by the employee from the card regarding the success of the employee as well as the supervisor who observed the success. Communicating with the retail center or the third party card provider, the incentive company also receives data regarding the respective redemptions of rewards. The incentive company then aggregates, analyzes, and reports the data to the client company.

Another way the You Did It Right! card concept may be used is in a peer review situation where peer employees (instead of supervisors) review positive or negatives implementations of the instruction step. Here, the incentive company would provide the client company with the You Did It Right! cards and associated potential rewards to reward to incentivise successful identification of successes and/or failures to following the training step. The client company distributes the You Did It Right! cards to employees, the employees observe their peers, and describe safety hazards and mistakes and/or successes of other employees. The employees, having filled out their You Did It Right! card would then access a computer terminal, enter the You Did It Right! card data identifying the safety hazards created by others or the successes of others, enter the alpha-numeric identifier, receive a reward, and redeem the reward at a retail location. The retail center then seeks reimbursement (as necessary such as for the coupon embodiment) from either the third party card provider or the incentive company as necessitated by the particular embodiment. The incentive company then receives information entered into the terminal by the employee from the card regarding the peer and workplace review by the employee of the other employees. Communicating with the retail center or the third party card provider, the incentive company also receives data regarding the respective redemptions of rewards. The incentive company then aggregates, analyzes, and reports the data to the client company, thereby allowing the company to have a record of success and failures while allowing whistle blowers the benefit of anonymity.

Likewise, in a hypothetical business or manufacturing setting where aggregate employees' health is being promoted, monitored and rewarded, the incentive company would provide the client company with literature regarding healthy living. The incentive company or a medical firm would schedule health screenings whereby employees are examined. When employees receive positive checkups or otherwise show improvement in health, such as an improved cholesterol score, the employees are given you-did-it right cards. The employees, having received a You Did It Right! card would then access a computer terminal, enter the You Did It Right! card data, receive a reward, and redeem the reward at a retail location. The retail center then seeks reimbursement (as necessary such as for the coupon embodiment) from either the third party card provider or the incentive company as necessitated by the particular embodiment. The incentive company then receives information entered into the terminal by the employee from the You Did It Right! card regarding the health status of the employee. Communicating with the retail center or the third party card provider, the incentive company also receives data regarding the respective redemptions of rewards. The incentive company then aggregates, analyzes, and reports the data to the client company. As such, without disclosing private health data of individual employees, the incentive company is able to report on the aggregate health of the client company's work force as well as any improvements. Further, the incentive company will be able to tailor health incentive programs for higher risk employees without penetrating the employee/employer privacy wall.

What is claimed is:

1. A method for training and rewarding a trainee comprising:

Step 1) providing an employee with an employee ID number, providing a supervisor of said employee with an employee ID number, providing an interactive input response device, providing a network system computer that is linked to the input response device, and providing a set of training metrics;

Step 2) training the employee based on the training metrics;

Step 3) providing the supervisor with a plurality of You Did It Right! cards, said You Did It Right! cards having a space for the supervisor to enter the supervisor's employee ID number, a space for the supervisor to enter the employee's employee ID number, a code identifier, and a check box listed next to each one of said training metrics;

Step 4) observing the employee by the supervisor for demonstration of training learned in step 2;

Step 5) filling out the You Did It Right! card by the supervisor;

Step 6) issuing the You Did It Right! card to the employee by the supervisor;

Step 7) accessing the interactive input response device by the employee;

Step 8) using the You Did It Right! card to enter the employee's employee ID number, the supervisor's employee ID number, the code identifier, and checked training metrics by the employee into the interactive input response device;

Step 9) calculating the value and type of reward, based on the checked training metrics on the You Did It Right! card entered in step 8, to be given to the employee and calculating the value and type of reward to be given to the supervisor, based on the issuance of the You Did It Right! card with the code identifier in step 6, by the network system computer;

Step 10) issuing the employee a reward and issuing the supervisor a reward;

Step 11) repeating steps 1 through steps 10; and

Step 12) collecting and analyzing a plurality of statistics on the number of You Did It Right! cards issued.

2. The method for training and rewarding a trainee of claim 1 wherein the calculation performed in step 9 is based on a variable win algorithm that rewards first time employee You Did It Right! card recipients with higher value rewards than repeat You Did It Right! card recipients.

3. The method of training and rewarding a trainee of claim 2 wherein the interactive input response device is a telephone.

4. The method of training rewarding a trainee of claim 2 wherein the interactive input response device is a personal computer terminal.

5. A method for training a trainee and rewarding a supervisor of a trainee comprising:

Step 1) providing an employee with an employee ID number, providing a supervisor of said employee with an employee ID number, providing an interactive input response device, providing a network system computer that is linked to the input response device, and providing a set of training metrics;

Step 2) training the employee based on the training metrics;

Step 3) providing the supervisor with a plurality of you-did-it-wrong cards, said you-did-it-wrong cards having a space for the supervisor to enter the supervisor's employee ID number, a space for the supervisor to enter the employee's employee ID number, a code identifier, and a check box listed next to each one of said training metrics in which the employee failed to comply;

Step 4) observing the employee by the supervisor for failure to demonstrate one or more of the of training metrics learned in step 2;

Step 5) filling out the you-did-it-wrong card by the supervisor;

Step 6) issuing the you-did-it-wrong card to the employee by the supervisor;

Step 7) accessing the interactive input response device by the supervisor;

Step 8) entering the employee's employee ID number, the supervisor's employee ID number the code identifier and checked training metrics by the supervisor into the interactive input response device;

Step 9) calculating the value and type of reward to be given to the supervisor based in the issuance of the you-did-it-wrong card with the code identifier in step 6 by the network system computer;

Step 10) issuing the supervisor a reward;

Step 11) repeating steps 1 through steps 10; and

Step 12) collecting and analyzing a plurality of statistics on the number of you-did-it-wrong cards issued.

6. The method of training rewarding a trainee of claim 5 wherein the interactive input response device is a telephone.

7. The method of training rewarding a trainee of claim 5 wherein the interactive input response device is a personal computer terminal.

* * * * *